US010157100B2

(12) United States Patent
Shivanna et al.

(10) Patent No.: US 10,157,100 B2
(45) Date of Patent: Dec. 18, 2018

(54) SUPPORT ACTION BASED SELF LEARNING AND ANALYTICS FOR DATACENTER DEVICE HARDWARE/FIRMARE FAULT MANAGEMENT

(71) Applicant: Hewlett Packard Enterprise Development LP, Houston, TX (US)

(72) Inventors: Suhas Shivanna, Bangalore (IN); Bino Joseph Polackal, Bangalore (IN); Afreen Ahmed, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/305,292

(22) PCT Filed: Apr. 30, 2014

(86) PCT No.: PCT/IN2014/000291
§ 371 (c)(1),
(2) Date: Oct. 19, 2016

(87) PCT Pub. No.: WO2015/166509
PCT Pub. Date: Nov. 5, 2015

(65) Prior Publication Data
US 2017/0039105 A1 Feb. 9, 2017

(51) Int. Cl.
*G06F 11/00* (2006.01)
*G06F 11/14* (2006.01)
(Continued)

(52) U.S. Cl.
CPC ........ *G06F 11/142* (2013.01); *G06F 11/0709* (2013.01); *G06F 11/0751* (2013.01);
(Continued)

(58) Field of Classification Search
USPC .......................................................... 714/15
See application file for complete search history.

(56) References Cited

U.S. PATENT DOCUMENTS 6,012,152 A   1/2000  Douik et al.
7,120,559 B1  10/2006 Williams et al.
(Continued)

FOREIGN PATENT DOCUMENTS

CN  101236567  8/2008
CN  102136204  7/2011

OTHER PUBLICATIONS

High Availability in the Datacenter Sun Sparc® Enterprise M4000, M5000, M8000, and M9000 Servers, (Research Paper), Jul. 2008, 128 Pgs.

(Continued)

*Primary Examiner* — Sarai E Butler
(74) *Attorney, Agent, or Firm* — Hewlett Packard Enterprise Patent Department

(57) ABSTRACT

Techniques for support activity based self learning and analytics for datacenter device hardware/firmware fault management are described. In one example, a service event including a unique service event ID, a set of prioritized cause and support engineer actions/recommendations and associated unique support engineer action codes are generated for the support engineer upon detecting a hardware/firmware failure event. Support engineer actions taken by the support engineer upon completing the service event are then received. The support engineer actions are then analyzed using the set of prioritized cause and support engineer actions/recommendations and FRU configuration information before and after servicing the hardware/firmware failure. Any potential errors resulting from the support engineer actions are then determined and notified at real-time to the support engineer based on the outcome of the analysis. Any
(Continued)

needed updates to the set of prioritized cause and support engineer actions/recommendations are then recommended.

15 Claims, 4 Drawing Sheets

(51) Int. Cl.
*G06Q 50/00* (2012.01)
*G06F 11/07* (2006.01)

(52) U.S. Cl.
CPC ....... *G06Q 50/00* (2013.01); *G06F 2201/805* (2013.01); *G06F 2201/82* (2013.01)

(56) References Cited

U.S. PATENT DOCUMENTS 7,730,364 B2  6/2010  Chang et al.

| | | | |
|---|---|---|---|
| 2004/0153823 A1* | 8/2004 | Ansari | G06F 11/0715 |
| | | | 714/38.14 |
| 2006/0149612 A1 | 7/2006 | Engle et al. | |
| 2011/0061051 A1 | 3/2011 | Haber et al. | |
| 2011/0086634 A1 | 4/2011 | Rahman | |
| 2012/0297016 A1* | 11/2012 | Iyer | G06F 9/5072 |
| | | | 709/217 |
| 2013/0073914 A1* | 3/2013 | Kaul | G06F 12/0253 |
| | | | 714/49 |
| 2013/0086411 A1* | 4/2013 | Bauer | G06F 11/2035 |
| | | | 714/3 |
| 2015/0355976 A1* | 12/2015 | Carey | G06F 11/1441 |
| | | | 714/23 |

OTHER PUBLICATIONS

International Searching Authority, The International Search Report and the Written Opinion, PCT/IN2014/000291, dated Dec. 30, 2014, 13 Pgs.

* cited by examiner

| UNIQUE SERVICE EVENT ID | HARDWARE/FIRMWARE FAILURE EVENT | CAUSE | SUPPORT ENGINEER ACTION/RECOMMENDATION | UNIQUE SUPPORT ENGINEER ACTION CODE | PRIORITY |
|---|---|---|---|---|---|
| 1000 | ERROR READING DATA FROM MEMORY | DIMM IS FAULTY | REPLACE THE FAULTY DIMM | REPLACE_DIMM | 1 |
| 1000 | ERROR READING DATA FROM MEMORY | DIMM IS INCORRECTLY SEATED | CHECK IF THE DIMM IS PROPERLY SEATED. OTHERWISE RESEAT THE DIMM | RESEAT_DIMM | 2 |
| 1000 | ERROR READING DATA FROM MEMORY | DIMM CONNECTOR ON THE BOARD IS FAULTY | REPLACE THE BOARD THAT CONTAINS THE FAULTY DIMM CONNECTOR | REPLACE_BOARD | 3 |

SUPPORT ACTION BASED SELF LEARNING AND ANALYTICS FOR DATACENTER DEVICE HARDWARE/FIRMARE FAULT MANAGEMENT

BACKGROUND

Advanced reliability, availability and supportability (RAS) is becoming increasingly a differentiating factor for hardware manufacturers with the commoditization of servers and other network components in a data center. Automated hardware/firmware analysis is also generally becoming a challenge when it comes to isolating problems spanning multiple subsystems. As computer technology advances, for example with continuous changes to fabrication technologies, analysis of hardware/firmware errors based on past experience and data may not always be appropriate for newer hardware/firmware products.

The lack of historic failure data for new hardware/firmware can result in hardware vendors shipping error analysis algorithms that may not always pin point to a particular field replaceable unit (FRU) or reason for failure. For example, it may be difficult to know if a dual inline memory module (DIMM) error is caused due to bad fabrication, bad connector, dynamic random access memory (DRAM) failure, and/or problem with motherboard's traces and chipset like scalable memory buffers. In another example, several processor cards can plug into and make use of a common system bus where additional memory modules or IO modules may also be plugged into the common system bus. If a fault occurs in a memory controller or IO controller, the fault can appear to be caused by a fault on itself or one of the FRUs of the common bus. Example FRUs are network card, sound card, video card, modem, storage device, and the like.

Existing fault management solutions for such complex error analysis scenarios spanning multiple subsystems, typically, generate a service event along with a recommendation including an ordered set of actions to a support engineer upon detecting a hardware/firmware failure event. For example, in the case of a memory failure, a series of steps starting with reseating a DIMM, replacing the DIMM (if problem persists), and/or replacing mother board (if problem further persists) are generally recommended.

BRIEF DESCRIPTION OF THE DRAWINGS

FIG. 2 is an example table of event and associated action codes stored in an event and action code repository snap shot (EACRS) or a centralized event and action code repository (CEACR), such as those shown in FIGS. 1A and 1B, respectively.

DETAILED DESCRIPTION

In the following description and figures, some example implementations of systems and/or methods for support activity based self learning and analytics for datacenter device hardware/firmware fault management are described. Various examples described below relate to self learning from support engineer's field support activities and automatically fine tune and generate recommendations of hardware/firmware error analysis solutions. More specifically examples describe validating support engineer's actions, detecting anomalies and implement closed loop solutions to automatically close the support event/call with the required data to correct the hardware/firmware errors in the field.

The terms "support engineer", "service engineer", "field engineer" and "customer engineer" are used interchangeably throughout the document. Further, the terms "hardware" and "field replaceable unit (FRU)" are being used interchangeably throughout the document. Furthermore, the terms "service activity", "field activity", "field support activity" and "support activity" refer to service and/or support actions performed in the field by a support engineer. In addition, the term "datacenter device hardware and firmware" can also refer to servers and storage and network devices. Also the term "managed device" refers to a "managed server", "server", and the like. The terms "datacenter device" and "managed device" are being used interchangeably throughout the document. Moreover, the term "hardware/firmware failure event" refers to an error condition observed in a hardware component like processor, memory, fan and the like and/or a failure of a hardware device during initialization that may be caused due to a firmware bug.

Figure 1A:
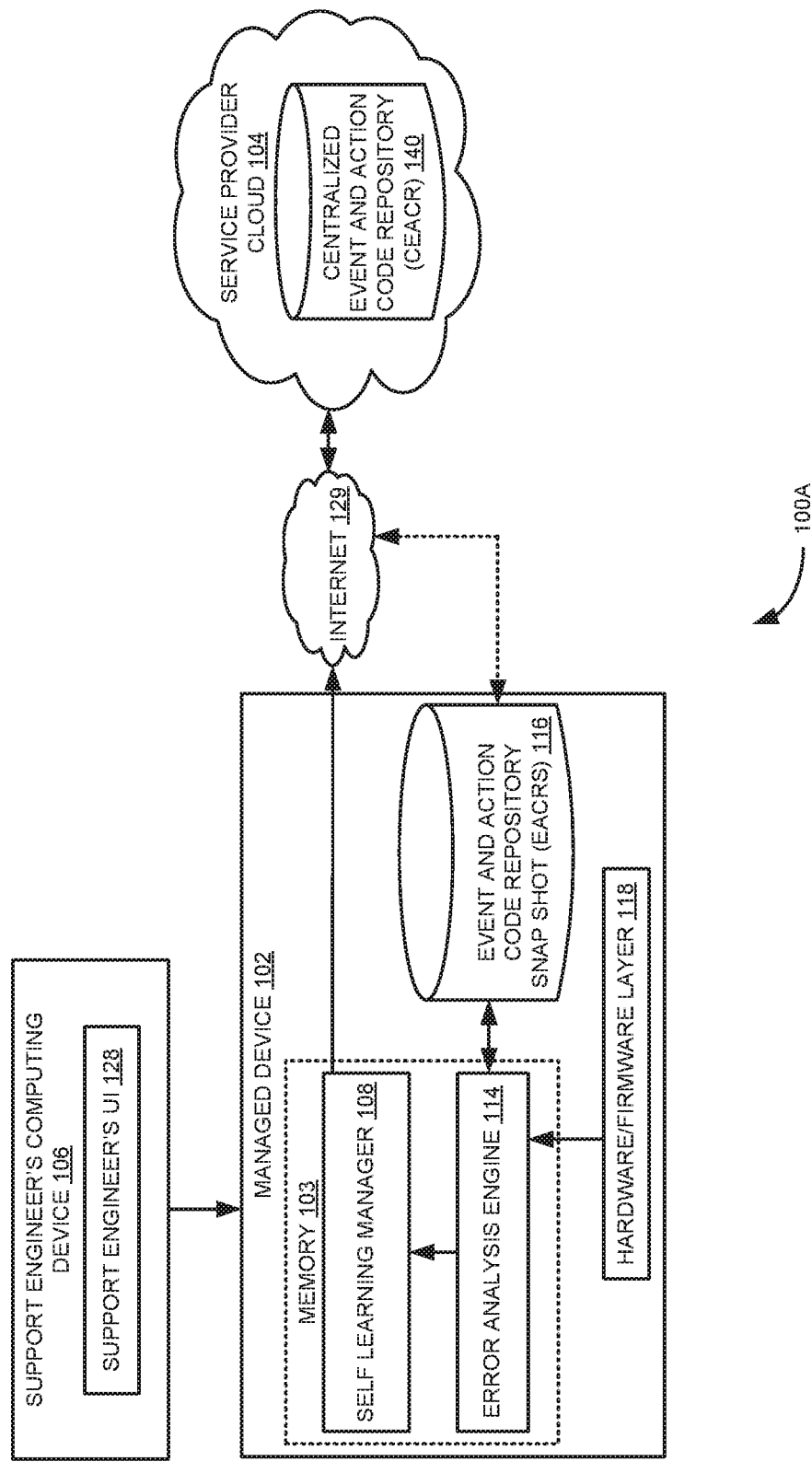
FIG. 1A is a block diagram depicting an example support activity based self learning and analytics for datacenter device hardware/firmware fault management.

FIG. 1A is a block diagram of a system 100A depicting an example scenario of support activity based self learning and analytics for datacenter hardware/firmware fault management. Referring to FIG. 1A, the example system 100A depicts a support engineer's computing device 106 including a support engineer's user interface (UI) 128. As depicted in FIG. 1A, the example system 100A further includes a managed device 102 coupled to the support engineer's computing device 106. Further, as depicted in FIG. 1A, the managed device 102 includes memory 103, which in turn includes a self learning manager 108, an error analysis engine 114. Furthermore, as depicted in FIG. 1A, the managed device includes an event and action code repository snapshot (EACRS) 116 and a hardware/firmware layer 118.

Figure 1B:
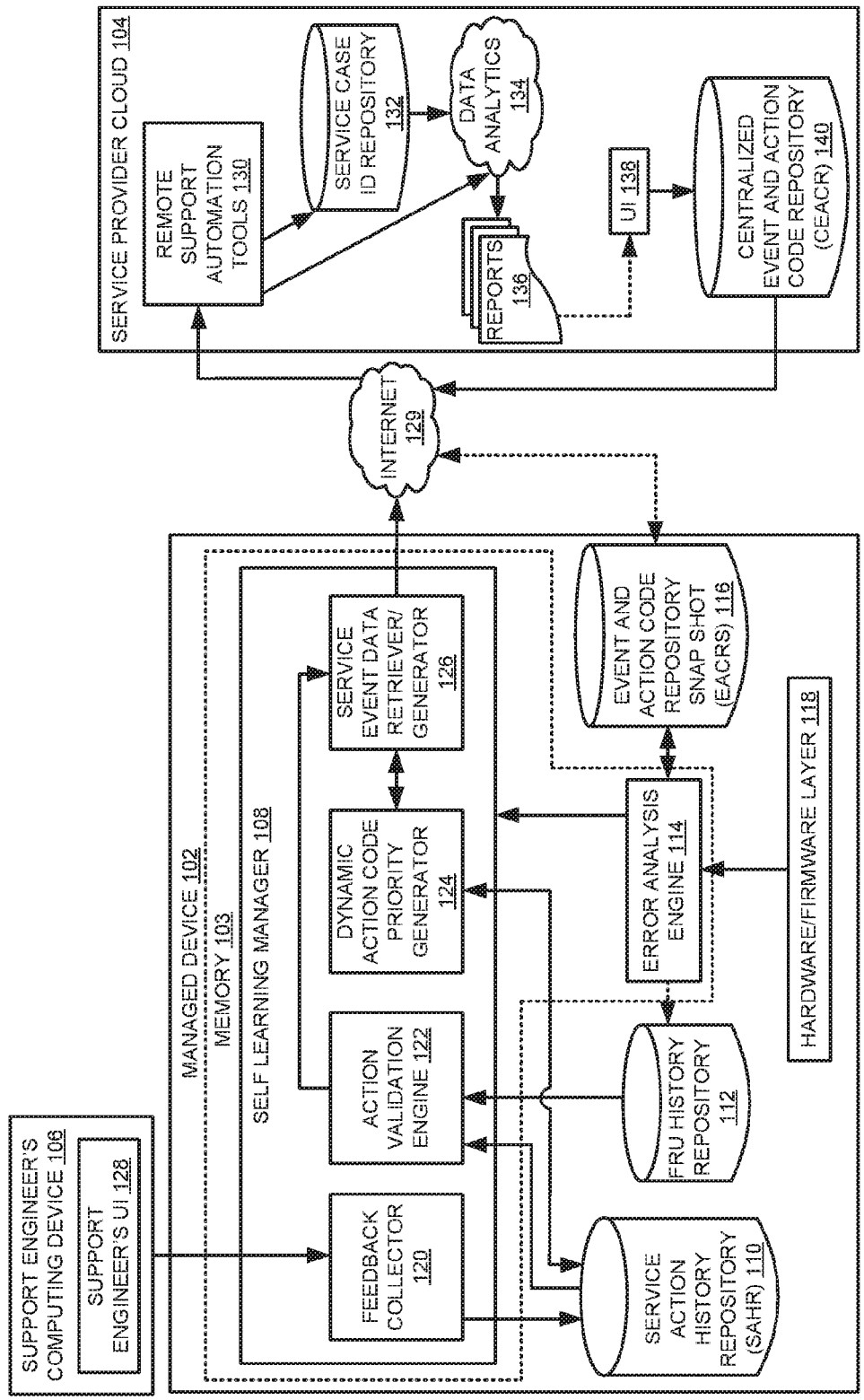
FIG. 1B is another block diagram depicting an example support activity based self learning and analytics for datacenter device hardware/firmware fault management including major components of the managed device, the self learning manager, and the service provider cloud, such as those shown in FIG. 1A.

FIG. 1B is another block diagram of a system 100B that is similar to FIG. 1A except that the managed device 102 is shown including some major components and their interconnectivity and also shown including a service provider cloud 104 communicatively coupled to the managed device 102 via Internet 129. As shown in FIG. 1B the managed device 102 further includes a service action history repository (SAHR) 110 and an FRU history repository 112. Also as shown in FIG. 1B, the self learning manager 108 includes a feedback collector 120, an action validation engine 122, a dynamic action code priority generator 124 and a service event data retriever/generator 126. Further as shown in FIG. 1B, the service provider cloud 104 includes remote support automation tools 130, a service case identification (ID) repository 132, a data analytics cloud 134 and associated reports 136, a user interface (UI) 138, and a centralized event and action code repository (CEACR) 140.

In operation, a service event including a unique service event ID, a set of prioritized cause and support engineer actions/recommendations and associated unique support engineer action codes is generated for a support engineer using a mapping table 200, such as those shown in FIG. 2, by the error analysis engine 114 upon detecting a hardware/firmware failure event via the hardware/firmware layer 118 associated with the managed device 102. Example set of prioritized cause and support engineer actions/recommendations are a set of prioritized cause/recommendations. The cause/recommendations is a combination of field replaceable unit (FRU) replacements and/or non FRU replacement procedures, and further the order of FRU replacement cause/recommendations can be based on an annual failure rate of associated FRUs. In some example scenarios, where hardware/firmware failure event symptoms may not be isolated to a specific field replaceable unit (FRU), an ordered set of cause/recommendation action description will be provided in the service event generated by the error analysis engine 114. The cause/recommendation action can be a combination of FRU replacement and/or non FRU replacement For example, recommending first to reseat an FRU and then recommending replacing the FRU if the reseating does not resolve the failure. The order for FRU replacement cause/recommendation action description may be based on annual failure rate of associated FRUs. In some examples, the error analysis engine 114 generates a service event along with problem cause/recommendations upon detecting a hardware/firmware failure event. Further in these examples, each service event may be accompanied by a unique service event ID along with location identifiers as to where the hardware/firmware failure event occurred or was detected. Furthermore in these examples, the error analysis engine 114 may store all associated FRU information, such as serial number, part number and the like. Also in these examples, the error analysis engine 114 may be configured to generate the service event including a unique service event ID, a set of prioritized cause/recommendations, associated unique support engineer action codes, location identifier as to where the hardware/firmware failure event occurred or detected, FRU vital information for the support engineer using the mapping table. The vital information includes FRU serial number, FRU port number and/or FRU time of failure.

In some examples, a unique support engineer action code is defined for each possible support engineer actions that are associated with hardware/firmware failure events. For example, a unique support engineer action code of "1234": DIMM may be assigned to a possible support engineer action of "reseat FRU": DIMM" while possible support engineer action code of "replace FRU": DIMM" may be assigned with a unique support engineer action code of "4321": DIMM. In these examples, architected unique support engineer action codes may be defined to corresponding different support engineer actions that can be taken by a support engineer. Further for example, for a support engineer action of "reseating a DIMM", the unique support engineer action code may be defined as "RESEAT_DIMM", for a support engineer action of "updating firmware", the unique support engineer action code may be defined as "UPDATE_FW" and so on. In these examples, the mapping table including each support engineer action and associated unique support engineer action codes is stored in the EACRS 116 and/or a central event and action code repository (CEACR) 140 residing in the service provider cloud 104 that is coupled to the managed device 102 via Internet 129. In addition to these examples, a recommendation text may be associated with the support engineer action code along and an extract of these support engineer action codes and a service event definition may be bundled with an instance of the error analysis engine 114. Also in these examples, mapping of service event recommendations and associated unique support engineer action codes for various managed devices and product platforms may be maintained in the CEACR 140. Further, a snap shot of metadata information (mapping table, such as those show in FIG. 2) correlating support engineer action codes and prioritized service event recommendations applicable to a specific product and/or platform may be stored in the EACRS 116. In one example, EACRS 116 includes a snap shot of the data in CEACR 140 at a point in time. The snap shot may be bundled with all managed devices that have the hardware/firmware analytical capability.

Even though the error analysis engine 114 is shown residing in the managed device 102, it can be envisioned that the error analysis engine can be located remotely and can be configured to work with more than one managed device 102. In one example, unique support engineer action codes for each possible support engineer's actions for different managed devices and platforms are stored in the CEACR 140. Further, associative map of service event recommendations and unique support engineer's action codes are stored in the CEACR 140. In this example, UI 138 associated with the CEACR 140 is modified to accommodate the addition of the unique support engineer's action codes.

The support engineer actions taken by the support engineer, in response to the service event and upon completing the service event, are then received by the self learning manager 108 via a support engineer's user interface (UI) 128 residing in the support engineers computing device 106. In some examples, support engineer actions taken by the support engineer in response to the service event and upon completing the service event are received by the feedback collector 120 residing in the self learning manager 108 via a support engineer's user interface (UI) 128 residing in the support engineer's computing device 106. In some examples, the feedback collector 120 stores the support engineer actions in a non-volatile storage, such as the SAHR 110 for offline analytics. In some examples, the service event, the unique support engineer action ID including the details of the action taken by the support engineer and associated service event ID are sent in real-time to the service provider cloud 104 to signal the completion of the service event. In these examples, the support engineer enters the unique support engineer action codes and associated support engineer actions via the support engineer's UI 128 upon completing the service call in response to the service event. In these examples, the support engineer may also enter associated free flowing text via the support engineer's UI 128, which may be used for providing low level details regarding the support engineer actions taken in response to the service event and also may be used for providing feedback to the action validation engine 122 on any new cause/recommendation found by the support engineer. In one example, the action validation engine 122 validates any action taken by a support engineer. Further, the action validation engine 122 sends a completion event notification to the service provider cloud 104 via Internet 129 to indicate the completion of the service event and status is updated in the service case ID repository 132. In some examples, feedback collector 120 is configured to receive the data entered by the support engineer after completing the service event via the support engineer's UI 128 and then store the data in the SAHR 110 for future analytics. In one example, SAHR 110 is used to store data related to support engineer actions taken by a support engineer in response to a service call/event. Further in this example, the dynamic action code priority generator 124 automatically reorders the cause/recommendation information (stored in SAHR 110 and/or EACRS 116) associated with the service event based on support engineer's previous action history, conditional probability algorithms using number of instances where support engineer takes a different action when compared with recommendations and annual failure rate. In some examples, the dynamic action code priority generator 124 automatically reorders the cause/recommendation information based on recovery policies.

The self learning manager 108 then analyzes the support engineer actions taken by the support engineer with the set of prioritized cause and support engineer actions/recommendations. In some examples, the action validation engine 122 residing in the self learning manager 106 automatically analyzes and validates the support engineer actions taken by the support engineer with the set of prioritized cause and support engineer actions/recommendations. Further the action validation engine 122 then determines any potential errors resulting from the support engineer actions taken by the support engineer and notifying the support engineer based on the outcome of the analysis. In some examples, the action validation engine 122 validates the support engineer actions taken by the support engineer using any stored FRU hardware/firmware failure event information in the FRU history repository 112. For example, if the recommended action was "REPLACE_FRU" at a specific location in the managed device 102, the action validation engine 122 uses the unique support action code and compares the obtained FRU hardware/firmware failure event information after completing the service event with the FRU hardware/firmware failure event information before completing the service event to see if the FRU was replaced at the specified location. If there is any discrepancy in the support engineer's actions, the action validation engine sends out alerts to the support engineer of a potential wrong action(s). To enable learning and for any future dynamic analysis, the unique support action code, failure symptom, location identifier, and time of performing the service action are stored in the SAHR 110. In some examples, the action validation engine 122 may use the stored data associated with the unique support action code if a similar hardware/firmware failure event occurs at the same location within a predetermined time interval. In such a situation, the action validation engine 122 may trigger automatic reorder of cause/recommendation information associated with the unique support action code based on support engineer's previous support action history, conditional probability algorithms and annual failure rate of hardware components. In these examples, the dynamic action code priority generator 124 along with the service event data retriever/generator 126 update the unique support action code priorities for a service event based on support engineer entered data for the service event via the support engineer's UI 128 obtained from SAHR 110. In one example, the service event data retriever/generator 126 retrieves associated support engineers action codes and generates a service event. The dynamic action code priority generator 124 reorders the cause/recommendation information for the service event based on support engineer's previous action history, conditional probability algorithms and annual failure rate of hardware components. In one example, FRU history repository 112 is configured to store unique support engineers action code data associated with each FRU in the managed device 102.

The action validation engine 122 then dynamically recommends any needed updates to the set of prioritized cause and support engineer actions/recommendations based on the outcome of the analysis by the self learning manager 108. In some examples, service events and associated support engineer actions may also be used to detect potential user errors and to dynamically trigger updating of recommendations for any similar future errors. Also in these examples, statistical techniques, user defined policies and analytics may be used to update prioritized support engineer actions and recommendations in the EACRS 116 and/or CEACR 140.

In one example, the executable instructions can be part of an installation package that when installed can be executed by the self learning manager 108 to implement the systems 100A and B. In one example, the memory resource in the systems 100A and B can also be a portable medium such as a CD, a DVD, a flash drive, or memory maintained by a computer device from which the installation package can be downloaded and installed. In another example, the executable instructions can be part of an application or applications already installed. Here, the memory resource in the systems 100A and B can include integrated memory such as a drive, NVRAM, DRAM or the like.

In the discussion herein, the self learning manager 108 and the error analysis engine 114 in FIGS. 1A and 1B have been described as a combination of circuitry and executable instructions. Such components can be implemented in a number of fashions. The executable instruction can be processor executable instructions, such as program instructions, stored on memory, such as memory 103, which is a tangible, non-transitory computer readable storage medium, and the circuitry can be electronic circuitry, managed device 102, for executing those instructions. The managed device 102, for example, can include one or multiple processors. The memory 103 can store program instructions, which enable support activity based self learning and analytics for datacenter device hardware/firmware fault management as a result of code generated by the self learning manager 108 and/or the error analysis engine 114. The memory 103 can be integrated in the same managed device 102 or it can be in a separate computing system that is accessible to the managed device 102.

As shown in FIGS. 1A and 1B, the self learning manager 108 including the feedback collector 120, action validation engine 122, dynamic action code priority generator 124 and service event data retriever/generator 126 can be stored in a same computing system or distributed across servers, other devices or storage mediums, or a combination thereof. For example, an instance of the self learning manager 108 and the error analysis engine 114 can be executing on one or more of the processor resources of the server devices. The engines and/or modules can complete or assist completion of operations performed in describing another engine and/or module. The engines, generators, drivers and/or modules can perform the example method described in connection with FIG. 3.

Figure 3:
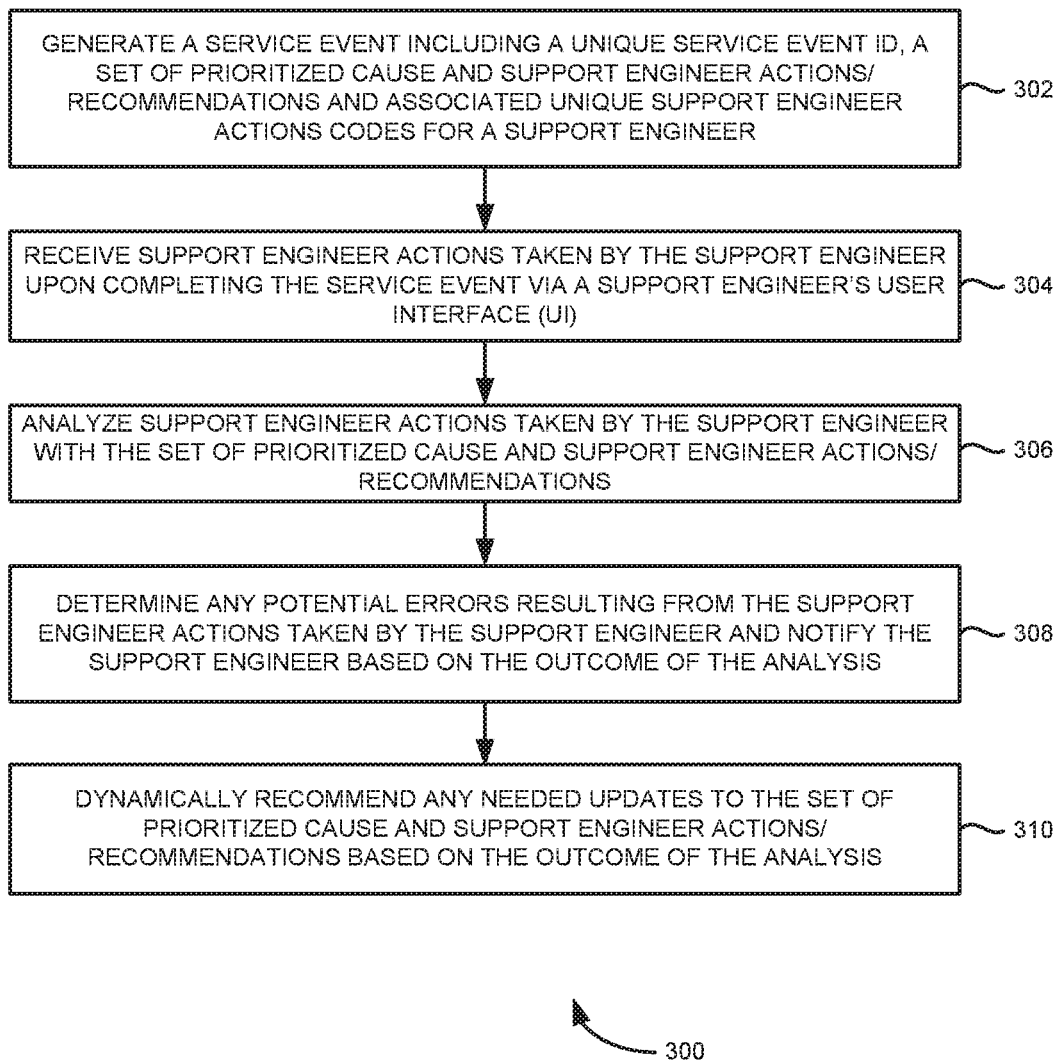
FIG. 3 is a flow diagram depicting an example method for support activity based self learning and analytics for datacenter device hardware/firmware fault management.

FIG. 3 is a flow diagram 300 depicting an example method for support activity based self learning and analytics for datacenter device hardware/firmware fault management. Referring to FIG. 3, example methods for implementing support activity based self learning and analytics for datacenter device hardware/firmware fault management is described below.

At block 302, a service event including a unique service event ID, a set of prioritized cause and support engineer actions/recommendations and associated unique support engineer action codes are generated for a support engineer by an error analysis engine using a mapping table upon detecting a hardware/firmware failure event via a hardware/firmware layer associated with a managed device in the datacenter. In this example, the mapping table includes each of support engineer's actions/recommendations and associated cause and unique support engineer action codes as shown in example table in FIG. 2. In some examples, a centralized repository (CEACR), such as those shown in FIGS. 1A and 1B, includes all hardware/firmware failure events, associated cause and support engineer's actions/recommendations and unique support engineer action codes for all the managed nodes and platforms in a datacenter. In these examples, a mapping table including a snap shot of the data associated with a managed node in the CEACR is stored in the event and action code repository snap shot (EACRS), such as those shown in FIGS. 1A and 1B, associated with the managed node. It can envisioned that such mapping table associated with managed nodes, shown in FIGS. 1A and 1B, can be bundled and shipped along with such hardware/firmware fault management solutions.

At block 304, support engineer actions taken by the support engineer is then received upon completing the service event via a support engineer's user interface (UI) by a self learning manager, such as those shown in FIGS. 1A and 1B. In this example, the support engineer after completing the service event, provides feedback on the actual action taken during the repair procedure. The feedback may be in the form of unique support engineer action code, unique service event ID, and any free flowing text.

At block 306, support engineer actions taken by the support engineer are then analyzed with the set of prioritized cause and support engineer actions/recommendations by the self learning manager. In some examples, the support engineer feedback is then stored in a non-volatile memory (SAHR), such as those shown in FIGS. 1A and 1B for offline analytics. In some examples, if the managed device is connected to a service provider cloud, such as those shown in FIGS. 1A and 1B, the unique service event ID along with the unique support engineer action code and the free flowing text are then sent to the service provider cloud to store in the CEACR).

At block 308, any potential errors resulting from the support engineer actions taken by the support engineer is determined and notified the support engineer based on the outcome of the analysis by the self learning manager. In some examples, the actions taken by the support engineer to complete the service event is then verified using the generated set of prioritized cause and support engineer actions/recommendations. This may be accomplished by comparing the system configuration information before and after completing the service event (repair) associated with unique support engineer action code.

At block 310, any needed updates to the set of prioritized cause and support engineer actions/recommendations are dynamically recommended based on the outcome of the analysis by the self learning manager. For example, if the error analysis engine generates and recommends replacing DIMM in location 1 and if the support engineer replaces DIMM in location 2 and enters the action taken for replacing the DIMM, a notification including the details of anomaly is automatically sent to the support engineer. For another example, if the generated recommendations in the highest order of priority are to perform action 1, action 2 and then action 3 and in majority of the completed service events is only following action 2 to complete the service event, then the error analysis engines based on statistical analysis and frequency may automatically change the set of prioritized cause and support engineer actions/recommendations in the CEACR and EACRS. For another example, after completing the verification and analysis if there are anomalies in the action taken by the support engineer, a notification including these anomalies may be automatically sent to the owner of these service events, which may enable a proactive modification to the stored set of prioritized cause and support engineer actions/recommendations. In some examples, the feedback received from the support engineer may be used to close the support case automatically in the service provider cloud. In some examples, the action taken by the support engineer may also be used to automatically update the local snap shot of the CEACR and EACRS to reflect any new set of prioritized cause and support engineer actions/recommendations. Such automatic updates to the CEACR and EACS may be controlled using service policies based on, for example, percentage of service events and statistical analysis.

The above examples describe an automated support action based self learning and analytics technique that uses a combination of the self learning manager 108 and error analysis engine 114 for datacenter device hardware/firmware fault management. Further, the above examples describe an automated real-time notification of any potential errors that might have arisen in completing the service event to the support engineer. This is accomplished by comparing the FRU configuration of the datacenter device before the failure event with the FRU configuration of the datacenter device after completing the service event by the support engineer along with any service engineer's feedback.

The method associated with the flow diagram 300 of FIG. 3 is explained in more detail with reference to FIGS. 1A, 1B and 2 above. Although the flow diagram of FIG. 3 illustrates specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter. Even though the above FIGS. 1A and 1B are described using only one managed device 102 in the datacenter, one skilled in the art would appreciate that the idea can be extended to any number of managed devices, such as multiple servers in a datacenter.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the invention that is defined in the following claims.

What is claimed is:

1. A system, comprising:
   a support engineer's computing device;
   a centralized event and action code repository (CEACR); and
   a managed device coupled to the support engineer's computing device and the CEACR, wherein the managed device, comprising:
     a self learning manager;
     an event and action code repository snap shot (EACRS);
     an error analysis engine; and
     a hardware/firmware layer coupled to the error analysis engine, wherein the self learning manager and the error analysis engine are to:
       generate a service event for a support engineer, the service event including a unique service event ID and an associated set of prioritized cause and support engineer actions/recommendations, each of the prioritized cause and support engineer actions/recommendations associated with a unique support engineer action code, wherein the service event is generated upon detecting a hardware/firmware failure event via the hardware/firmware layer;
receive support engineer actions taken by the support engineer upon completing the service event;
compare the support engineer actions taken by the support engineer with the set of prioritized cause and support engineer actions/recommendations;
determine any potential errors resulting from the support engineer actions and notifying the support engineer based on the outcome of the comparison; and
dynamically recommend any needed updates to the set of prioritized cause and support engineer actions/recommendations based on the outcome of the comparison.

2. The system of claim 1, wherein the self learning manager and the error analysis engine are further to:
store the support engineer actions taken by the support engineer in a service action history repository (SAHR).

3. The system of claim 1, wherein the self learning manager along with the error analysis engine are further configured to:
send the unique service event ID and the support engineer actions taken by the support engineer along with a confirmation of completion of the service event to a remote datacenter to enable automatic closure of a service event.

4. The system of claim 1, wherein the self learning manager and the error analysis engine are further to:
define a unique support engineer action code for each possible support engineer actions/recommendations associated with hardware/firmware failure events; and
store a mapping table including each of the prioritized cause and support engineer actions/recommendations and associated unique support engineer action codes in EACRS and/or a central event and action code repository (CEACR) residing in a service provider cloud.

5. The system of claim 1, wherein the self learning manager and the error analysis engine are to compare support engineer actions taken by the support engineer with the set of prioritized cause and support engineer actions/recommendations, comprising the step of:
comparing support engineer actions taken by the support engineer with the set of prioritized cause and support engineer actions/recommendations using statistical techniques.

6. The system of claim 1, wherein the set of prioritized cause and support engineer actions/recommendations, comprises:
a combination of field replaceable unit (FRU) replacements and/or non FRU replacement procedures, and further the order of FRU replacement cause/recommendations are based on an annual failure rate of associated FRUs.

7. The system of claim 6, wherein the self learning manager and the error analysis engine are to generate the service event including a unique service event ID, a set of prioritized cause/support engineer actions/recommendations, associated unique support engineer action codes, location identifier as to where the hardware/firmware failure event occurred or detected, FRU vital information for the support engineer using the mapping table, wherein the vital information includes FRU serial number, FRU port number and/or FRU time of failure.

8. A non-transitory computer readable storage medium comprising a set of instructions executable by at least one processor resource to:
generate a service event for a support engineer, the service event including a unique service event ID and an associated set of prioritized cause and support engineer actions/recommendations, each of the prioritized cause and support engineer actions/recommendations associated with a unique support engineer action code, wherein the service event is generated upon detecting a hardware/firmware failure event via a hardware/firmware layer of a managed device;
receive support engineer actions taken by the support engineer upon completing the service event;
compare the support engineer actions taken by the support engineer with the set of prioritized cause and support engineer actions/recommendations;
determine any potential errors resulting from the support engineer actions taken by the support engineer and notifying the support engineer based on the outcome of the comparison; and
dynamically recommend any needed updates to the set of prioritized cause and support engineer actions/recommendations based on the outcome of the comparison.

9. The non-transitory computer readable storage medium of claim 8, wherein the set of instructions are executable by the at least one processor resource to:
store the support engineer actions taken by the support engineer in a non-volatile memory for off-line analytics.

10. The non-transitory computer readable storage medium of claim 8, wherein the set of instructions are executable by the at least one processor resource to:
send the service event ID and the support engineer actions taken by the support engineer along with a confirmation of completion of the service event to a remote datacenter.

11. A method for support activity based self learning and analytics for datacenter device hardware/firmware fault management, comprising:
generating a service event for a support engineer, the service event including a unique service event ID and an associated set of prioritized cause and support engineer actions/recommendations, each of the prioritized cause and support engineer actions/recommendations associated with a unique support engineer action code, wherein the service event is generated using a mapping table including each of the prioritized cause and support engineer actions/recommendations and associated unique support engineer action codes, wherein the service event is generated by an error analysis engine upon detecting a hardware/firmware failure event via a hardware/firmware layer associated with a managed device in the datacenter;
receiving support engineer actions taken by the support engineer upon completing the service event via a support engineer's user interface (UI) by a self learning manager;
comparing the support engineer actions taken by the support engineer with the set of prioritized cause and support engineer actions/recommendations and field replaceable unit (FRU) configuration information before and after servicing the hardware/firmware failure by the self learning manager;

determining any potential errors resulting from the support engineer actions taken by the support engineer and notifying the support engineer based on the outcome of the comparison by the self learning manager; and dynamically recommending any needed updates to the set of prioritized cause and support engineer actions/recommendations based on the outcome of the comparison by the self learning manager.

12. The method of claim 11, further comprising:

storing the support engineer actions taken by the support engineer in a non-volatile memory for off-line analytics.

13. The method of claim 11, further comprising:

sending the service event ID and the support engineer actions taken by the support engineer along with a confirmation of completion of the service event to a remote datacenter.

14. The method of claim 11, further comprising:

defining a unique support engineer action code for each possible support engineer actions/recommendations associated with hardware/firmware failure events;

maintaining the mapping table including each of the prioritized support engineer actions/recommendations and associated unique support engineer action codes in the EACSR and/or in the central event and action code repository (CEACR) residing in a service provider cloud.

15. The method of claim 11, wherein comparing support engineer actions taken by the support engineer with the set of prioritized cause and support engineer actions/recommendations, comprises:

comparing support engineer actions taken by the support engineer with the set of prioritized cause and support engineer actions/recommendations using a statistical technique.

* * * * *